of plastic impregnated fiberglass cloth about .010 inch thick is positioned between and adhesively bonded to the face surfaces of each reinforcing plate, and extends therefrom into said airfoil section, (f) and a bolt hole passing through said root section and the faces of said reinforcing plates and adapted to receive a blade retaining bolt.

9. A substantially hollow, fiberglass cloth reinforced plastic blade for helicopters having a chord, a span, a leading edge and a trailing edge and side walls joining the leading and trailing edges and comprising:

(a) a tip section,
(b) a root section,
(c) a substantially hollow airfoil section extending between said tip section and root section,
(d) a central support spar extending for substantially the full blade span and being of a flat shape and symmetric about the blade chord in said root section and extending along the blade leading edge in said hollow airfoil section,
(e) a plurality of reinforcing aluminum plates about .010 inch thick and having roughened opposite face surfaces and being embedded in said root section in face-to-face relation and oriented to be substantially parallel to the blade chord and spaced so that a sheet of plastic impregnated fiberglass cloth about .010 inch thick is positioned between and adhesively bonded to the face surfaces of each reinforcing plate, and extends therefrom into said airfoil section, said reinforcing plates being of various lengths in the blade span direction and of various widths in the blade chord direction and positioned to present a smoothly tapering plate pattern in both the blade chord and span directions,
(f) and a bolt hole passing through said root section and the faces of said reinforcing plates and adapted to receive a blade retaining bolt.

10. A substantially hollow, fiberglass cloth reinforced plastic blade for helicopters having a chord, a span, a leading edge and a trailing edge and side walls joining the leading and trailing edges and comprising:

(a) a tip section,
(b) a root section,
(c) a substantially hollow airfoil section extending between said tip section and said root section,
(d) a central support spar extending for substantially the full blade span and being of a flat shape and symmetric about the blade chord in said root section and extending along the blade leading edge in said hollow airfoil section,
(e) a plurality of reinforcing aluminum plates about .010 inch thick and having roughened and primed opposite face surfaces and being embedded in said root section in face-to-face relation and oriented to be substantially parallel to the blade chord and spaced so that a sheet of plastic impregnated fiberglass cloth about .010 inch thick is positioned between and adhesively bonded to the face surfaces of each reinforcing plate, and extends therefrom into said airfoil section, said reinforcing plates being of various lengths in the blade span direction and of various widths in the blade chord direction and positioned to present a smoothly tapering plate pattern in both the blade chord and span directions and which pattern peaks at approximately the center of said blade side walls,
(f) and a bolt hole passing through said root section and the faces of said reinforcing plates and adapted to receive a blade retaining bolt.

11. A substantially hollow, fiberglass cloth reinforced plastic blade for helicopters having a chord, a span, a leading edge and a trailing edge and side walls joining the leading and trailing edges and comprising:

(a) a tip section,
(b) a root section,
(c) a substantially hollow airfoil section extending between said tip section and said root section,
(d) a central support spar extending for substantially the full blade span and being of a flat shape and symmetric about the blade chord in said root section and extending along the blade leading edge in said hollow airfoil section,
(e) a plurality of reinforcing aluminum plates about .010 inch thick and having roughened and primed opposite face surfaces and being embedded in said root section in face-to-face spaced relation and oriented to be substantially parallel to the blade chord, a first plurality of sheets of plastic impregnated fiberglass cloth arranged so that a sheet of plastic impregnated fiberglass cloth about .010 inch thick is positioned between and adhesively bonded to the face surfaces of each reinforcing plate and extends therefrom into said airfoil section, a second plurality of sheets of plastic impregnated fiberglass cloth each having a selectively shaped aperture therein and arranged so that a sheet of fiberglass cloth of said second plurality is positioned between adjacent sheets of fiberglass cloth of said first plurality, and further so that one of said aluminum plates fits snugly into each of said apertures, said reinforcing plates being of various lengths in the blade span direction and of various widths in the blade chord direction and positioned to present a smoothly tapering plate pattern in both the blade chord and span directions and which pattern peaks at approximately the center of said blade side walls,
(f) and a bolt hole passing through said root section and the faces of said reinforcing plates and adapted to receive a blade retaining bolt,
(g) blade retaining means including plate members positioned gainst the side walls of said root section and including bolt holes aligned with said bolt hole in said root section,
(h) and a blade retaining bolt passing through said bolt holes in said root section and said blade retaining means and being sized to snugly engage said holt holes.

12. A substantially hollow plastic helicopter blade reinforced with woven fiberglass cloth and having a chord, a span, a leading edge, a trailing edge, and side walls joining said leading and trailing edges and comprising:

(a) a blade tip section,
(b) a blade root section,
(c) a blade airfoil section extending between said tip section and said root section,
(d) a central reinforcing spar extending for substantially the full span of the blade and shaped at the blade root section to be substantially flat and extending symmetrically along the blade chord for substantially the full chord dimension,
(e) a plurality of flat, thin shims having face surfaces and being positioned on opposite sides of said central spar in said blade root section and extending substantially parallel to the blade chord and spaced apart so that at least one layer of plastic impregnated fiberglass cloth extends between and is adhesively bonded to said face surfaces of each shim and extends therefrom into said blade airfoil section,
(f) at least one bolt hole extending through the blade root section and through the face surfaces of said central spar and each shim.

13. Apparatus according to claim 12 wherein said shims are aluminum plates about .010 inch thick.

14. Apparatus according to claim 13 wherein said shims are coated with a primer to prevent oxidation thereof and to strengthen the bond between the shim and the fiberglass cloth reinforced plastic.

15. A helicopter blade made of plastic reinforced with fiberglass cloth and including a root section built up of alternate bonded, substantially equal thickness layers of May 23, 1967     K. PFLEIDERER ETAL     3,321,020
HELICOPTER ROTOR
Filed March 25, 1965     6 Sheets-Sheet 2
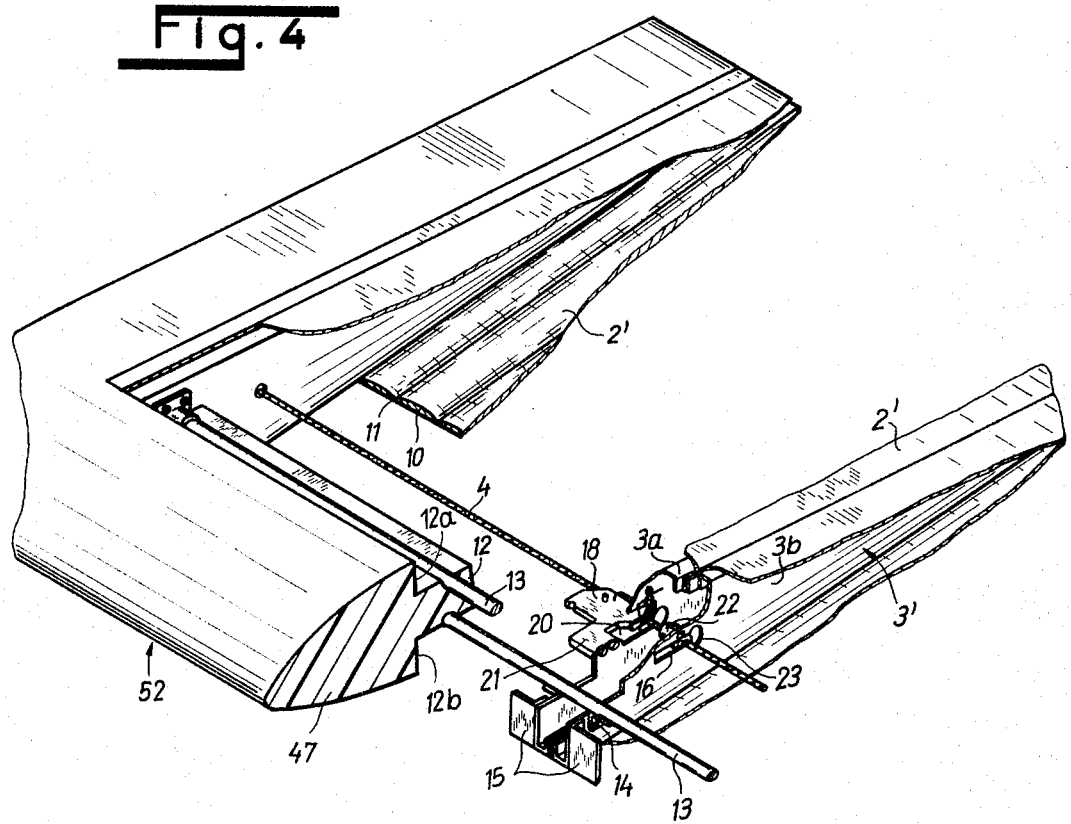
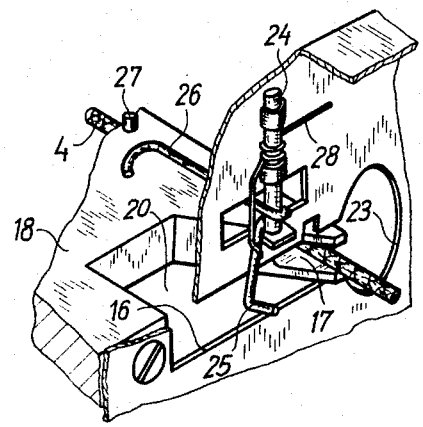
INVENTORS
Kurt Pfleiderer
Alois Schwarz
By *Mulgrew and Toren*
ATTORNEYS May 23, 1967    K. PFLEIDERER ETAL    3,321,020
HELICOPTER ROTOR Filed March 25, 1965                 6 Sheets-Sheet 3

INVENTORS
Kurt Pfleiderer
Alois Schwarz

By

ATTORNEYS

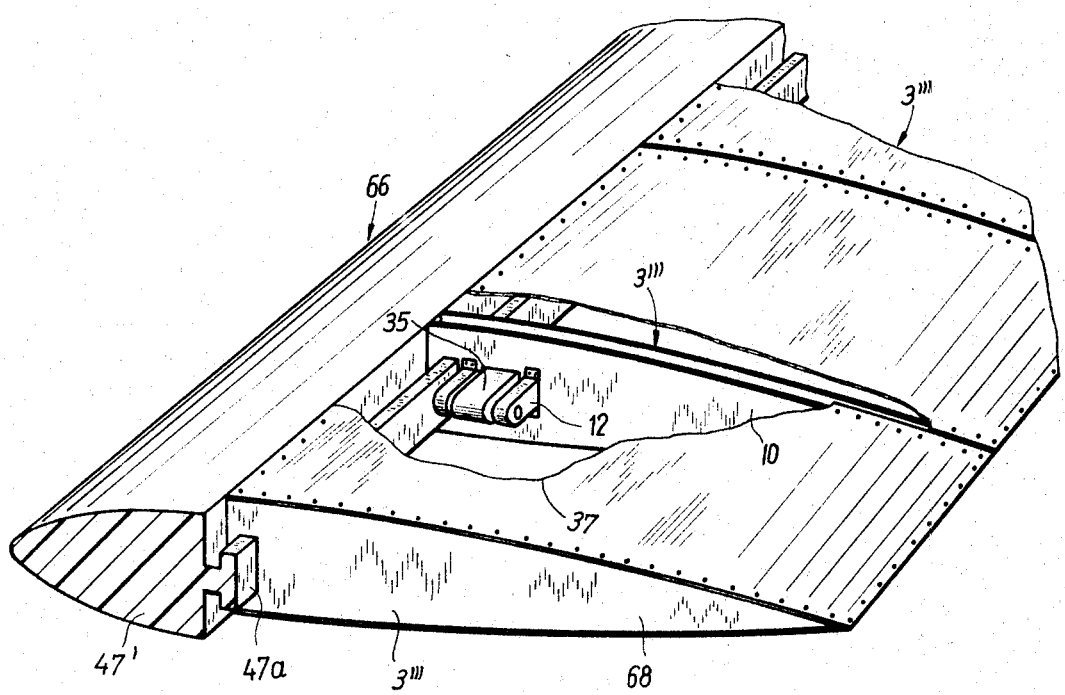

INVENTORS
Kurt Pfleiderer
Alois Schwarz

United States Patent Office 3,321,020
Patented May 23, 1967

3,321,020
HELICOPTER ROTOR
Kurt Pfleiderer, Munich, and Alois Schwarz, Ottobrunn, Germany, assignors to Bolkow Gesellschaft mit beschrankter Haftung, Ottobrunn, near Munich, Germany
Filed Mar. 25, 1965, Ser. No. 442,735
Claims priority, application Germany, Mar. 28, 1964, B 76,105
25 Claims. (Cl. 170—160.11)

This invention relates in general to rotary wing aircraft and rotor blade construction therefor, and in particular to a new and useful foldable rotor blade or rotating wing construction for aircraft of a type in which the rotor blades are deactivated after take-off for horizontal high speed flight.

The present invention is particularly directed to aircraft of a type which is referred to as a convertible rotary wing aircraft in which the rotary wing is deactivated after vertical flying has been accomplished in order to fold them out of position during forward flight. In order to be able to adapt the flying speeds of convertible rotary wing aircraft of this type to those of conventional rigid wing planes, the rotors, which rotate in vertical take-off and landing and in hovering, are stopped after starting a driving unit for effecting the propulsion of a plane in horizontal flight. After attaining a sufficient flying speed for producing the lift for the fixed wings of the aircraft, the rotary blade elements are retracted into the fuselage. Airplanes with specially designed rotors, in contrast to planes having rotors exposed during the high speed forward flight or those with pivotal propellers, come closest to the ideal realization of a convertible airplane.

At the present time there are rotors that can be deactivated in high speed flight and retracted into the fuselage. Such rotors usually include retractable or folding rotor blades or rotor blades made of a bending elastic material which permits the whole blade to be retracted into the rotor head after a certain speed has been attained and to be wound on drums. In convertible planes of this type, however, the moment of inertia of the rotating wing system is varied in a disadvantageous manner by the retracting of the blades. In addition, it was found that the rotary wings perform, during their retraction because of reduced centrifugal forces, uncontrollable instabile flapping motions in the range of advance vertions so that great bending moments act on the blades.

In order to avoid the disadvantages of the retractable rotor blades and to provide a rotor blade which permits it to be stopped and retracted even when rigid blades are employed without great technical disadvantage, it is known in such convertible rotary wing aircrafts with single blade and two blade rotors, to make each rotor blade so that it can be turned about a swivel joint arranged between the rotor head and the rotor blade so that they may be shifted into alignment with the fuselage. With aircraft of this type there is the additional difficulty that an instability of the flapping movement and torisional moments will appear about the control axle during the retraction of the rotor blade due to reversed flow which results in a considerable stress on the rotor and control system with the resulting unfavorable vibration effects on the fuselage of the aircraft. In addition, such an arrangement is only practical with a two blade rotor.

In accordance with the present invention there is provided a rotary wing aircraft and aircraft blade construction which does not have the disadvantage of the prior art constructions. A rotor constructed in accordance with the invention may be stopped and retracted independent of the number of blades and without causing vibrations and moments during this process. This is especially important since the stopping and retraction takes place in the transition phase from vertical flight to high speed forward flight, during which time it is very undesirable to have the undesirable flapping and uncontrolled movement of the rotor blades under the critical flight conditions.

In accordance with the invention, at least one rotor blade spar is provided with a formation or profile defining an air foil section or profile producing only minor lift and little drag. The blade structure is such that the outer skin and rib structure, which forms the overall blade profile when extended, may be retracted along the spar to the interior of the rotor and the exposed spar will have very little undesirable effects in respect to flight.

A feature of the construction is that the lift producing profile of the blade elements can be eliminated simultaneously and uniformly on all rotor blades, even before the rotor is stopped. This has the effect that only a resistance but no lift is produced by the exposed spar after the outer covering and rib structure is retracted along the spar toward the center of the rotor. With such a construction the instability of the flapping movement and the bending moments are completely avoided and the rotor spars maintain their full moment of inertia so that the rotor runs quietly and steadily even during a slow landing run. The rotor blades and their spars can be folded during the stoppage in a known manner without difficulty about pivot axes parallel to the rotor axes and the entire rotor can either be retracted completely into the fuselage or set in recesses along the side thereof. The folding of the blade spars and the locking of the rotor blade spars in their operative position can be easily effected by hydraulic, electrical or mechanical control means.

A preferred embodiment of the invention provides an arrangement of a rib structure and outer skin which are displaceably mounted in a longitudinal direction of the blade spar which has a cross section which itself produces a relatively small lift or air disturbance. With such a construction the rotor blades can be provided with a relatively optimum aerodynamic profile for the production of lift so that power consumption of the rotor can be reduced to a minimum.

Accordingly it is an object of the invention to provide an improved rotary wing aircraft of a type in which the rotor blades may be stopped during flight and wherein the blade includes a spar of a profile producing relatively little air resistance and upon which spar are slidably movable rib elements and outer skin coverings therefor in a manner which permits the retraction of the rib elements along the spar and of the outer skin into the central portion of the aircraft.

A further object of the invention is to provide a rotary wing blade structure which includes a spar element of substantially rigid or semi-rigid construction which provides a slideway for a plurality of ribs which carry the outer skin which is advantageously made of a foldable material, and further including means for causing the retraction of the rib elements with the skin and the folding of the skin along the spar between the elements when it is desired to shift from rotor operation to high speed flight operation using another propulsion means.

A further object of the invention is to provide a rotor blade construction which includes lift producing wing profile-forming elements which are retractable along a spar element with means connected to the profile-forming elements for causing the retraction of the inner ones first and the next outer ones in succession and the locking interengagement of elements folded in a fully retracted position.

A further object of the invention is to provide a helicopter and a rotary wing or blade structure therefor which simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a fragmentary perspective view of a portion of a rotary wing or blade structure constructed in accordance with the invention;

FIG. 2 is a fragmentary top plan view of a rotor blade in accordance with another embodiment of the invention;

FIG. 3 is a fragmentary and enlarged detail of a portion of the blade indicated in FIG. 2;

FIG. 4 is a fragmentary perspective view, partly in section, of the blade indicated in FIGS. 2 and 3;

FIG. 5 is an enlarged fragmentary detail of a portion of the blade indicated in FIG. 4;

FIG. 8 is a fragmentary perspective view of still another embodiment of the invention;

Figure 6:
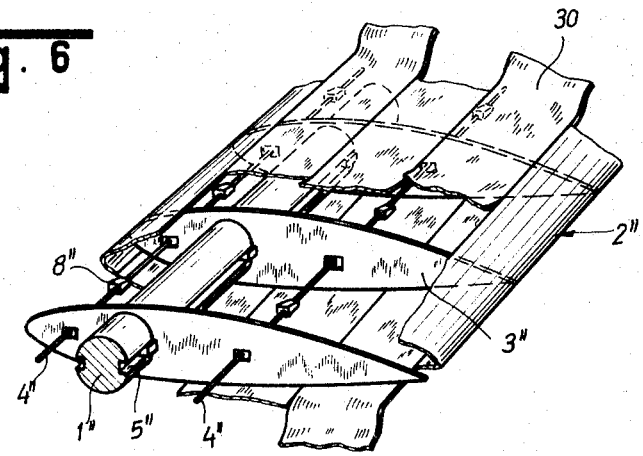
FIG. 6 is a view similar to FIG. 1 of another embodiment of the invention.

Referring to the drawings in particular, the invention as embodied in FIG. 1, comprises a rotor wing or blade structure generally designated 50 which in accordance with the invention includes a rigid or semi-rigid spar 1 which is connected at its inner end (not shown) to a rotor head (not shown) and extends outwardly therefrom. The spar 1 is advantageously of a shape or profile which will afford little or no resistance to the air and will not affect the lift of the aircraft when exposed in the air stream by itself. Associated with the spar 1 is lift-producing profile means which includes a plurality of individual rib members 3 which are provided with a circular opening to accommodate the spar 1 and are slidable along the spar. In addition, the lift-producing profile means includes an outer skin or covering 2 which is made of a material to permit its folding. The lift producing profile means which is associated with the spar is made of relatively light-weight material and it may be moved outwardly along the spar 1 from the rotor hub (not shown) into a profile-forming position extended along the spar 1 with the individual rib elements or ribs 3 separated under the action of the centrifugal force during rotation of the wing. The individual ribs are advantageously connected at spaced locations to the covering or skin 2 with spacings which will conform to the advantageous spacings of the rib members when the ribs and the covering 2 are fully extended. The lift-producing profile means are so light that the position of the center of gravity of the total blade can be readily controlled.

In accordance with the invention, a traction or tow rope 4 extends through openings 7 of each of the ribs 3 and it is wound at its inner end (in the vicinity of the rotor not shown) on a drum which permits the winding up thereof for the purpose of retracting or folding up the lift-producing profile means. Each rib 3 advantageously carries a slider element 6 which fits into a longitudinally defined groove 5 on each side of the spar 1 and holds the rib against rotative movement about the spar but permits longitudinal sliding movement thereon. The same result may be accomplished, for example, by providing a spar with angled sides such as having a spar with a polygonal cross section, for example, so that the spar would engage with the ribs without permitting rotation about the spar.

Control means such as traction ropes 4 extend or are guided over the entire length of the resultant blade structure and each carries followers 8 which are spaced along the length thereof. The spacings of the followers 8 are such that they will engage against the side of a rib and move the associated rib in a desirable manner. In a preferred arrangement the intervals are such that the ribs 3 adjacent to the inner end of the blade, i.e. the rotor head (not shown), are moved first when the rotor blade is retracted. Collapsing of the blade structure or retraction thereof will thus occur by the reducing of the spacing between the ribs on the inward side first and then a gradual reducing of the spacing between the ribs along the outer radius of the spar 1. In some instances it is preferable to secure the covering or skin 2 to the ribs 3 only in the vicinity of the narrow trailing edge of each rib by using adhesives or other suitable securing means. A feature of the construction is that the lift producing profile means will unfold under the influence of centrifugal force after the rotor is rotated to rotate the spar 1 with the lift-producing profile means.

According to a preferred embodiment of the invention, weights (not shown) are secured at the ends of the profile structure and at the end of the skin 2 in particular to enhance the unfolding of the skin under the action of centrifugal force and to prevent the formation of folds in the stretched skin.

In a preferred arrangement, the traction ropes 4 with the followers 8 are advantageously conducted through the ribs 3 at the location of the exact center of gravity thereof. Of course, the invention is not limited to such a construction, and other means, such as chains, spindles, etc., may be used for folding the lift-producing profile means.

It has been found that it is particularly advantageous to insure that the collapsing or the folding up of the lift-producing profile means for each wing is accomplished such that the outer skin is folded uniformly. This is achieved advantageously by providing an outer skin or covering 2' which is made as indicated in FIGS. 2 to 5 by forming the covering 2' with fold lines made by corresponding material reinforcements or extensions and reductions, respectively. Such a construction produces the folding lines 9 in the covering 2' which extends transverse to the longitudinal direction of the blade structure. The folding lines 9 are represented by corresponding reinforcements 10 and reductions 11 of the material thickness of the covering 2' (folded position indicated in FIG. 2, unfolded position indicated in FIG. 4). In this embodiment, a control element or rope 4 carries spaced followers or control elements 22 which are designed as wedge elements and are arranged so that they are pulled out of the profile skin or covering 2' toward the rotor head when the covering 2' is folded inwardly and as soon as the respective rib 3' strikes against a stop. The spacing of the wedge elements 22 is such that when the traction rope 4' is wound up, the inner ribs 3' will be moved first, and then each successive outer rib will be moved inwardly to a collapsed position. This insures that the aerodynamic form profile of the extended portion will be maintained until the whole structure is fully retracted on the spar with which it is associated.

As indicated particularly in FIGS. 3 and 4, the lift-producing means comprises the ribs 3' which consist of two parts 3a and 3b which form together a block-shaped element and a covering 2'. The parts 3a and 3b advantageously include marginal flange portions permitting the profile skin 2' to be clamped therebetween when the latter are assembled. In this way, a very good mechanical fastening of the profile skin 2' on the ribs 3' is achieved without damaging the skin in any way.

In the embodiments of FIGS. 2 to 5, the lift-producing means includes a spar 47 which is designed in the form of a front portion of the blade structure and forms about 25% of the complete lift-producing profile when the lift-producing profile means is fully extended. This has the advantage that on the one hand the form of the structure as well as the arrangement of the guidance of the lift-producing profile means including ribs 3' and the covering 2' will be considerably simplified and the spar 47 itself will not produce any marked lifting effect after the remaining portion of the lift-producing profile means is removed (i.e. that portion which forms the trailing lifting edge or 75% of the depth of the blade structure).

As best indicated in FIG. 4, the trailing edge of the spars 47 is provided with a central extension or projection 12 forming a guide for the ribs 3' which may move longitudinally therealong. In the embodiment illustrated, the guide 12 carries guide bars 13, 13 on each top and bottom portion thereof for facilitating the sliding movement of the ribs 3' which carry corresponding counter parts or curved brackets 14. This arrangement merely serves for increasing the guiding stability. In addition, angle plates 15, 15 on each side of the ribs 3' move in sliding engagement with a wall 12b defined on the spar 47.

The traction rope 4' is conducted through slots 16 which are elongated in a direction transverse to the longitudinal axis of the wing structure and rest when the profile skin 2 is extended in the groove 17 of a control piece generally designated 18. The control pieces 18 extend outwardly from the inward side of each rib (toward the rotor hub) behind the slot 16. The control pieces 18 include a bevelled edge 19 at the front end and their rear end includes a recess 20 directly adjacent the slot 16 which corresponds and conforms to the front formation thereof. The control pieces 18 are provided with a stop 21 which holds the ribs 3' with the outer covering 2' retracted at a minimum spacing for accommodating the folded skin 2' between the ribs 3'. The followers 22 are arranged on the traction rope 4' at the intervals which the ribs are to maintain when the profile covering 2' is extended. The spacing corresponds in their longitudinal extension approximately to the width of the cavity of the box-shaped profile defined by the side walls 3a and 3b of the ribs 3' in the range of the slot 16.

When the covering 2' is retracted, all the ribs 3' move at first toward the rotor head uniformly. As soon as the rib 3' strikes against the inner end adjacent the rotor head (not shown), the control piece 18 from the next preceding rib 3' and of the stop 21, respectively, engage the slot 16 and force the follower 22 on the rope 4' out of the range of the slot 16 into the range of an annular opening 23 defined at the inner end of the slot. The traction rope 4' is simultaneously lifted out of the groove 17 of the control piece 18 and the respective follower 22 can be retracted, together with the traction rope 4', once more. With such an arrangement the skin or covering 2' is only folded at the location where the ribs 3' are moved together and progresses from the inner end of the rotor head outwardly. The part which has not been folded and extends outwardly maintains its full aerodynamic profile form.

Each side 3a of the rib 3' is provided with a spring crank or stirrup 26 which is rotatable on a bolt 24 and includes an arm portion 25 formed with a hook. The hooked arm 25 cooperates with a pin 27 arranged on the control piece 18 of the rib 3' and locks the adjacent ribs 3' together when the ribs are fully retracted. This locking is effected by the deflection of the stirrups 26 by side wall 3b of the next stirrup 3' as it is moved inwardly by the traction rope 4 acting through the followers 22.

Only when the hooked arm 25 is disengaged from the pin 27 will the associated rib 3' be moved outwardly. This will not occur until the next adjacent rib 3' has been moved outwardly to permit return of the resilient stirrup 26 after disengagement of the hooked arm 25 from the pin 27. By insuring that the ribs 3' are extended individually in the direction of the outer end of the blade tip during the beginning of rotation of the rotor, it is always assured that the extended portion of the blade will have the desired profile.

In this embodiment (FIGS. 2, 3, 4 and 5) the blade or rotary wing structure 52 includes a tubular enclosure 29 which terminates at its inner end with a rotor mounting 29' and is open at its outer end. The enclosure 29 is anchored to the spar by means of bolt elements 54 at the inner (rotor head) end. The enclosure 29 corresponds in cross section approximately to the profile contour of the ribs 3' but it is of slightly greater dimensions in order to offer sufficient room for the fold of the retracted profile covering 2'.

Another embodiment of the invention provides a division of the profile skin or covering generally designated 2" into parallel longitudinally extending strips which overlap, as indicated in FIG. 6. This has the advantage that the curved profile skin can be folded together easier in a relatively narrow space and that the folding lines can be eliminated. In this embodiment similar parts are similarly indicated with the strip-shaped parts of the covering 2" designated 30. The strip-shaped parts 30 may be secured to the ribs 3 in any desirable manner. In this embodiment, the followers 8" are made of a wedge-shaped configuration with the narrow end extending toward the blade tip. This has the advantage that they are disengaged from the rib 3" during the retraction of the profile skin when the ribs strike against a stop (not shown).

Figure 7:
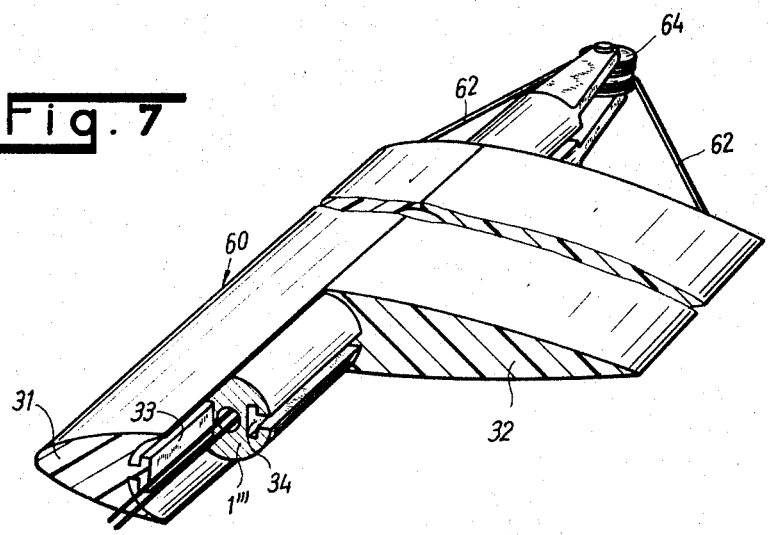
FIG. 7 is a perspective view of still another embodiment of the invention.

In a further development of the invention, the profiles of the leading edge and of the trailing edge of the blade can be made of sufficiently light weight, preferably resilient or bending-elastic material in either one or more pieces and can be provided with slide bars which slide in guides provided in the bar. This is a particular feature of the invention which has the advantage that the representation of the profile parts is considerably simplified. Besides, it permits an embodiment where each of the two profile parts is detached from the associated spar and rolled up separately. In FIG. 7 there is shown a construction of rotary wing or blade 60 which is formed with a forward-profile part 31 and a rearward-profile part 32 of a solid resilient material. These parts 31 and 32 must have so much elasticity perpendicularly to their longitudinal horizontal center plane they can be rolled up or folded up. They are arranged to engage corresponding opposite sides of a spar member generally designated 1''' and advantageously include T-shaped elements or tongues 33 which engage in similarly shaped grooves 34 defined on each side of the spar 1'''. In this embodiment, the movement of the profile skin formed by the parts 31 and 32 is effected under the action of centrifugal force. The retraction of the profile parts 31 and 32 is effected in a known manner by winding these parts up on a drum which may advantageously be arranged within the aircraft fuselage (not shown) and in some instances this winding up may be facilitated by traction ropes 62 which are guided over pulleys 64 to effect pulling of the inner ends of the elements 31 and 32 of the spar 1''' and to direct it over a winding drum (not shown). For such a construction the device advantageously includes guide rollers (not shown) and the blade tips and the parts 31 and 32 include suitably defined passages for the traction elements or ropes (not shown). In this embodiment, the overall lift-producing profile will provide an aerodynamic profile when extended to any portion as in the other embodiments.

In accordance with another feature of the invention which is schematically indicated in FIG. 8, there is provided a rotor blade or wing element generally designated 16 in which there is provided a spar 47' which is of the same general configuration as the spar in the embodiment of FIG. 4 and forms a portion of the lift-producing profile means but includes a T-shaped extension or tongue 47a at its inner end forming a sliding means for rib elements 3''' which are made up of side plates 68 and 70 connected by top and bottom plates designated 37. Brackets 72 on a wall 70 on one of the rib elements or assemblies 3''' provide pivotal support for a hinge 3 which is secured to the next adjacent rib element 3'''. The hinges 35 are arranged so that the parts 3''' can pivot in respect to each other. The elements 3''' are preferably secured on their underside on a band which can be reinforced by steel cable. In some instances the lower parts of the elements 3''' themselves will provide a function as a band and in this embodiment the rib elements also form the outer skin. In this embodiment, the extended portion of the wing 66 is wound up on a drum arranged within the rotor head (not represented in the drawings). As in the other embodiments, any portion of the wing which is extended will maintain a full aerodynamic configuration.

Figure 10:
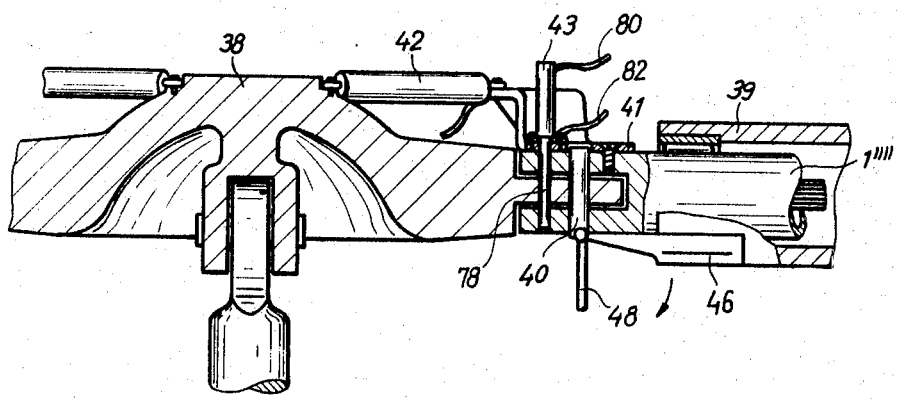
FIG. 10 is a section taken along the line 10—10 of FIG. 9.
Figure 9:
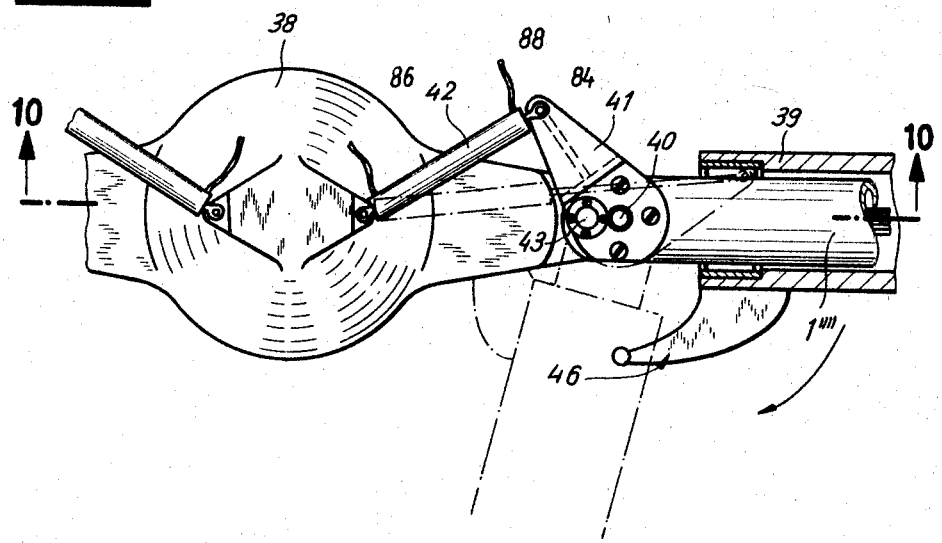
FIG. 9 is a partial top plan and sectional view of a rotor constructed in accordance with the invention.

In FIGS. 9 and 10 there is indicated a rotor head 38 for two rotor blades 39 (one of which is indicated). Each rotor blade 39 includes a spar 1'''' which is pivotally mounted on a bolt 40 at its inner end on the rotor head 38. The spar 1'''' may be anchored in this position by means of a bolt member 68 which forms an extension of a connecting rod of a piston (not shown) which is moved within a fluid pressure cylinder 43 under the control of fluid pressure directed through control lines 80 and 82. The piston may be retracted to move the bolt member 78 so that it clears the spar 1'''' to permit the pivotal movement thereof. The spar 1'''' is rigidly anchored by means of a lever 41 which is affixed thereto and which extends outwardly therefrom and is pivoted to a connecting rod 84 which is reciprocated under the control of a fluid control cylinder 42 which is actuated through control lines 86 and 88. The fluid cylinder 42 is a double action hydraulic cylinder which controls the movement of the connecting rod 84 to shift the lever 41 about the pivot point or bolt 40 when the bolt 78 is withdrawn. When this is done, the blade 39 is moved from the solid line position indicated in FIG. 9 to the dotted line position at which it extends alongside the fuselage (not shown) of the aircraft or is retracted within the fuselage. When the bolt 78 is inserted, the blade 39 is anchored to extend radially outwardly from the rotor 38. The blade 39 also includes a pitch adjustment which is effected through a lever 46 by movement of a control rod 48 which is secured thereto and actuated through the pilot's cabin (not shown). When the rotor is in the dotted line position, the rotor blade 39 advantageously includes portions which may be retracted as in the other embodiments, so that only the cylindrical spar 1'''' will be exposed to the air stream.

Figure 11:
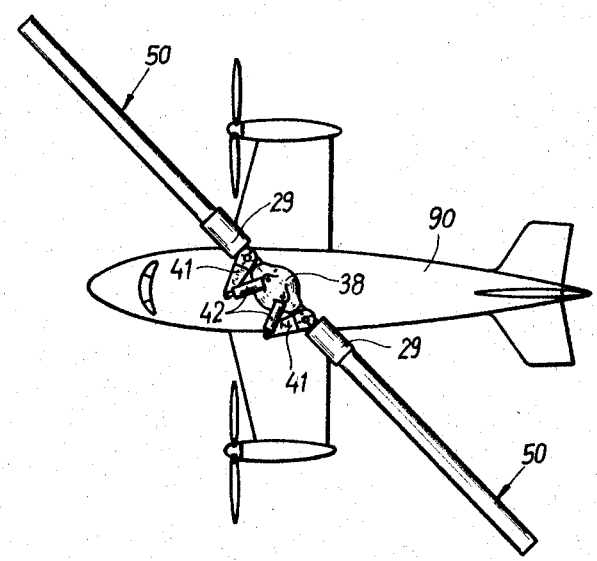
FIG. 11 is a plan view of an aircraft of the convertible type incorporating a rotary wing structure according to the invention.
Figure 12:
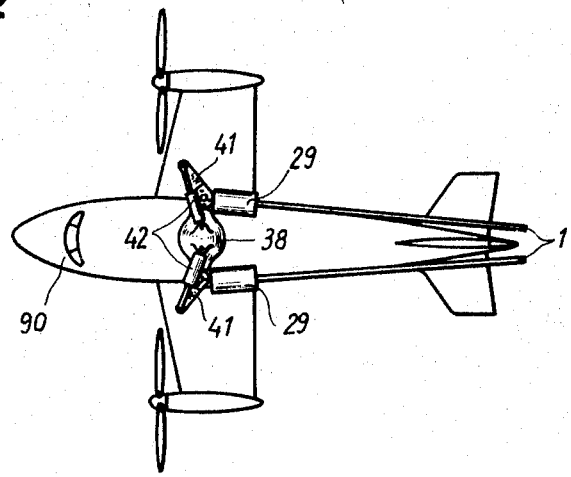
FIG. 12 is a plan view of the same aircraft as shown in FIG. 11, but with deprofiled and folded rotor blades.

FIGS. 11 and 12 show a complete aircraft 90 of the convertible type, the rotor of which incorporating the rotary wing blade construction according to the present invention, is shown in detail in FIGS. 1, 2, 9, 10.

FIG. 11 shows an aircraft the rotor of which is fully profiled and extended, while FIG. 12 shows a rotor with deprofiled and folded blades.

While specific embodiments of the invention have been shown and described in detail to illustrate the application of the inventive principles, it will be understood that the invention may be embodied otherwise without departing from such principles.

What is claimed is:

1. A blade construction for a rotary wing aircraft comprising a spar, and lift-producing profile means carried by said spar and forming a blade profile, and control means connected to said lift-producing profile means to shift said lift-producing profile means inwardly along the spar for retracting said lift-producing profile means.

2. A blade construction for a rotary wing aircraft comprising a spar, and lift-producing profile means carried by said spar and together with said spar forming a blade profile, and control means connected to said lift-producing profile means to shift said lift-producing profile means inwardly along the spar for retracting said lift-producing profile means, said spar having a configuration forming an air foil section of low drag when said lift-producing profile means is fully retracted.

3. A blade construction for a rotary wing aircraft comprising a spar, and lift-producing profile means carried by said spar and together with said spar forming a blade profile, and control means connected to said lift-producing profile means to shift said lift-producing profile means inwardly along the spar for retracting said lift-producing profile means, said lift-producing means including a plurality of ribs and a covering skin extending over said ribs, said ribs and said skin being connected to maintain proper spacing of said ribs, said control means being engageable in succession with said ribs from the innermost to the outermost to cause said outer position of said lift-producing means to maintain its air foil section while the inner end is being retracted.

4. A blade construction for a rotary wing aircraft comprising a spar of a configuration forming a low air drag, a plurality of ribs slidably mounted on said spar, means connecting said ribs and said spar for preventing said ribs from rotating around the axis of said spar but permitting sliding movement of said ribs in relation to said spar, and a covering over said ribs forming with said ribs a blade profile, and means connected to said covering and said ribs to selectively move said ribs and said covering in relation to said spar for retracting said blade profile.

5. A blade construction for a rotary wing aircraft comprising a spar, lift-producing profile means carried by said spar and forming a blade profile when extended along the complete length of said spar, and control means connected to said lift-producing profile means to shift it inwardly along said spar for retracting said lift-producing profile means to expose only said spar.

6. A blade construction for a rotary wing aircraft comprising a spar, lift-producing profile means carried by said spar and forming a blade profile when extended along the complete length of said spar, and control means connected to said lift-producing profile means to shift it inwardly along said spar for retracting said lift-producing profile means to expose only said spar, said lift-producing profile means including said spar which forms the forward portion of said blade profile and wherein the rear portion is retractable along the length of said spar.

7. A blade construction for a rotary wing aircraft comprising a spar, lift-producing profile means carried by said spar and forming a blade profile when extended along the complete length of said spar, and control means connected to said lift-producing profile means to shift it inwardly along said spar for retracting said lift-producing profile means to expose only said spar, said spar being a solid member, said lift-producing means including at least one rib means with an outer profile forming covering which are movable in respect to said spar.

8. A blade construction for a rotary wing aircraft comprising a spar, lift-producing profile means carried by said spar and forming a blade profile when extended along the complete length of said spar, and control means connected to said lift-producing profile means to shift it inwardly along said spar for retracting said lift-producing profile means to expose only said spar, said spar comprising a cylindrical member having a groove defined on each side thereof, said lift-producing profile means including a solid elastic member slidable in the forward groove of said spar and forming the forward portion of said blade profile, and a rear elastic member slidable in the rear groove of said spar forming the trailing portion of said blade profile.

9. A blade construction for a rotary wing aircraft comprising a solid spar member adapted to be connected at its inner end to a rotor hub and to extend radially outwardly therefrom, a plurality of rib members slidably connected to said spar and being slidably movable along the length thereof, covering means connected to said rib member, said covering means with said rib member forming at least a substantial portion of the blade profile, and control means connected to said rib members for shifting said rib members along said spar for retracting said rib members with said covering means in a direction toward the rotor head and to expose only said spar at the retracted portion.

10. A blade construction for a rotary wing aircraft comprising a solid spar member adapted to be connected at its inner end to a rotor hub and to extend radially outwardly therefrom, a plurality of rib members slidably connected to said spar and being slidably movable along the length thereof, covering means connected to said rib member, said covering means with said rib member forming at least a substantial portion of the blade profile, and control means connected to said rib members for shifting said rib members along said spar for retracting said rib members with said covering means in a direction toward the rotor head and to expose only said spar at the retracted portion, said control means including a traction rope movable relative to said ribs in a direction toward the inner end of said spar for retracting said lift-producing means, and follower means carried by said traction rope engageable with the innermost one of said ribs and then each next outer one in succession for collapsing said lift-producing means from the inner end first with the outer portion remaining forming a lift-producing blade profile until retracted.

11. A blade construction for a rotary wing aircraft comprising a solid spar member adapted to be connected at its inner end to rotor hub and to extend radially outwardly therefrom, a plurality of rib members slidably connected to said spar and being slidably movable along the length thereof, covering means connected to said rib member, said covering means with said rib member forming at least a substantial portion of the blade profile, and control means connected to said rib members for shifting said rib members along said spar for retracting said rib members with said covering means in a direction toward the rotor head and to expose only said spar at the retracted portion, said rib members comprising individual rib elements of complete air foil section having an opening therethrough through which said spar extends, said rib elements being slidable on said spar.

12. A blade construction for a rotary wing aircraft comprising a solid spar member adapted to be connected at its inner end to a rotor hub and to extend radially outwardly therefrom, a plurality of rib members slidably connected to said spar and being slidably movable along the length thereof, covering means connected to said rib member, said covering means with said rib member forming at least a substantial portion of the blade profile, and control means connected to said rib members for shifting said rib members along said spar for retracting said rib member with said covering means in a direction toward the rotor head and to expose only said spar at the retracted portion, said rib members comprising individual elements forming the trailing portion of a blade profile, said spar forming the forward portion, said spar having a forward air flow profile and with a trailing portion upon which said rib members are slidable.

13. A blade construction for a rotary wing aircraft comprising a solid spar member adapted to be connected at its inner end to a rotor hub and to extend radially outwardly therefrom, a plurality of rib members slidably connected to said spar and being slidably movable along the length thereof, covering means connected to said rib member, said covering means with said rib member forming at least a substantial portion of the blade profile, and control means connected to said rib members for shifting said rib members along said spar for retracting said rib members with said covering means in a direction toward the rotor head and to expose only said spar at the retracted portion, said rib members comprising individual elements forming the trailing portion of a blade profile, said spar member forming the forward portion with a forward air flow profile and with a trailing portion upon which said rib members are slidable, said rib members comprising two sections having flange portions which abut against each other, said outer skin being held between the flange portions of each of the abutting sections of said rib members and said skin including intermediate portions of lesser dimension forming fold lines between said rib members.

14. A blade construction for a rotary wing aircraft comprising a solid spar member adapted to be connected at its inner end to a rotor hub and to extend radially outwardly therefrom, a plurality of rib members slidably connected to said spar and being slidably movable along the length thereof, covering means connected to said rib members, said covering means with said rib members forming at least a substantial portion of the blade profile, and control means connected to said rib members for shifting said rib members along said spar for retracting said rib members with said covering means in a direction toward the rotor head and to expose only said spar at the retracted portion, said rib members comprising individual elements forming the trailing portion of a blade profile, said spar member forming the forward portion with a forward air flow profile and with a trailing portion upon which said rib members are slidable, said rib members comprising box-like elements with portions on the top and bottom thereof forming the outer skin, adjacent ones of said box-like elements being pivotally connected together to facilitate winding thereof when retracted from said spar.

15. A blade construction for a rotary wing aircraft comprising a solid spar member adapted to be connected at its inner end to a rotor hub and to extend radially outwardly therefrom, a plurality of rib members slidably connected to said spar and being slidably movable along the length thereof, covering means connected to said rib members, said covering means with said rib members forming at least a substantial portion of the blade profile, and control means connected to said rib members for shifting said rib members along said spar for retracting said rib members with said covering means in a direction toward the rotor head and to expose only said spar at the retracted portion, said outer skin including a plurality of longitudinally extending foldable strip elements which are secured together along their longitudinal marginal edges.

16. A blade construction for a rotary wing aircraft comprising a solid spar adapted to be connected at its inner end to a rotor hub and to extend radially outwardly therefrom, a plurality of rib members slidably connected to said spar and being slidably movable along the length thereof, covering means connected to said rib members, said covering means with said rib members forming at least a substantial portion of the blade profile, and connected to said rib members for shifting said rib members along said spar for retracting said rib members with said covering means in a direction toward the rotor head and to expose only said spar at the retracted portion, said spar comprising a substantially cylindrical member having a forward groove defined in one side and a trailing groove defined in its opposite side, said rib members including a forward portion slidable in the trailing groove of said spar, said members being of resilient collapsible material.

17. A blade construction for a rotary wing aircraft comprising a solid spar member adapted to be connected at its inner end to a rotor hub and to extend radially outwardly therefrom, a plurality of rib members slidably connected to said spar and being slidably movable along the length thereof, covering means connected to said rib members, said covering means with said rib members forming at least a substantial portion of the blade profile, and control means connected to said rib members for shifting said rib members along said spar for retracting said rib members with said covering means in a direction toward the rotor head and to expose only said spar at the retracted portion, a rotatable rotor head, means pivotally mounting said spar at its inner end on said rotor head, means connected to said spar for shifting said spar from an outward activated position extending substantially radially outwardly from said rotor head to a deactivated position folded backwardly in respect thereto, and control bolt means for bolting said spar to said rotor head at a fixed position, said bolt means being removable from said spar for permitting rotation thereof to a deactivated position.

18. A rotary wing aircraft comprising a rotatable rotor head, a blade assembly including a spar pivotally mounted at its inner end on said rotor head, bolt means for anchoring said spar in a radially extending position in respect to said rotor head, said bolt means including a removable bolt element for permitting pivotal movement of said blade assembly to a retracted position alongside said rotor head, and lift-producing profile means carried by said spar and slidably movable therealong, and control means associated with said lift-producing profile means for retracting said lift-producing profile means inwardly toward said rotor head to expose said spar.

19. A rotary wing aircraft comprising a rotatable rotor head, a blade assembly including a spar pivotally mounted at its inner end on said rotor head, bolt means for anchoring said spar in a radially extending position in respect to said rotor head, said bolt means including a removable bolt element for permitting pivotal movement of said blade assembly to a retracted position alongside said rotor head, and lift-producing profile means carried by said spar and slidably movable in respect thereto, and control means associated with said lift-producing profile means for retracting said lift-producing profile means inwardly toward said rotor head, including means to collapse the inner portion of said lift-producing profile means while the outer portion remains in a profile-forming condition on said spar permitting rotation of said rotor head with said blade assembly.

20. A rotary wing aircraft comprising a rotatable rotor head, a blade assembly including a spar pivotally mounted at its inner end on said rotor head, bolt means for anchoring said spar in a radially extending position in respect to said rotor head, said bolt means including a removable bolt element for permitting pivotal movement of said blade assembly to a retracted position alongside said rotor head, and lift-producing profile means carried by said spar and slidably movable in respect thereto, and control means associated with said lift-producing profile means for retracting said lift-producing profile means inwardly toward said rotor head, including means to collapse the inner portion of said lift-producing profile means while the outer portion remains in a profile-forming condition permitting rotation of said rotor head with the blade in the air stream, said lift-producing profile means including a plurality of rib members slidable on said spar member and forming at least a portion of the profile outline of said blade, said rib members including skin means associated therewith for forming the outer covering which is foldable upon slidable movement of said rib member inwardly along said spar.

21. A rotary wing aircraft comprising a rotatable rotor head, a blade assembly including a spar pivotally mounted at its inner end on said rotor head, bolt means for anchoring said spar in a radially extending position in respect to said rotor head, said bolt means including a removable bolt element for permitting pivotal movement of said blade assembly to a retracted position alongside said rotor head, and lift-producing profile means carried by said spar and slidably movable in respect thereto, and control means associated with said lift-producing profile means for retracting said lift-producing profile means inwardly toward said rotor head, including means to collapse the inner portion of said lift-producing profile means while the outer portion remains in a profile-forming condition permitting rotation of said rotor head with the blade in the air stream, said lift-producing profile means including a plurality of rib members slidable in said spar member and forming at least a portion of the profile outline of said blade, said rib members including skin means associated therewith for forming the outer covering which is foldable upon slidable movement of said rib member inwardly along said spar, said control means including a traction rope having follower means engageable with said ribs to move the inner ones of said ribs inwardly along said spar first and then the next additional ones.

22. A rotary wing aircraft comprising a rotatable rotor head, a blade assembly including a spar pivotally mounted at its inner end on said rotor head, bolt means for anchoring said spar in a radially extending position in respect to said rotor head, said bolt means including a removable bolt element for permitting pivotal movement of said blade assembly to a retracted position alongside said rotor head, and lift-producing profile means carried by said spar and slidably movable in respect thereto, and control means associated with said lift-producing profile means for retracting said lift-producing profile means inwardly toward said rotor head, including means to collapse the inner portion of said lift-producing profile means while the outer portion remains in a profile-forming condition permitting rotation of said rotor head with the blade in the air stream, said lift-producing profile means including a plurality of rib members slidable in said spar member and forming at least a portion of the profile outline of said blade, said rib members including skin means associated therewith for forming the outer covering which is foldable upon slidable movement of said rib member inwardly along said spar, said control means including a traction rope having follower means engageable with said ribs to move the inner ones of said ribs inwardly along said spar first and then the next additional ones, and means for locking each rib to the next adjacent outer one as said ribs are moved inwardly to a collapsed position along said spar.

23. A rotary wing aircraft comprising a rotatable rotor head, a blade assembly including a spar pivotally mounted at its inner end on said rotor head, bolt means for anchoring said spar in a radially extending position in respect to said rotor head, said bolt means including a removable bolt element for permitting pivotal movement of said blade assembly to a retracted position alongside said rotor head, and lift-producing profile means carried by said spar and slidably movable in respect thereto, and control means associated with said lift-producing profile means inwardly toward said rotor head, including means to collapse the inner portion of said lift-producing profile means while the outer portion remains in a profile-forming condition permitting rotation of said rotor head with the blade in the air stream, said lift-producing profile means including a plurality of rib members slidable in said spar member and forming at least a portion of the profile outline of said blade, said rib members including skin means associated therewith for forming the outer covering which is foldable upon slidable movement of said rib member inwardly along said spar, said control means including a traction rope having follower means engageable with said ribs to move the inner ones of said ribs inwardly along said spar first and then the next additional ones, and means for locking each rib to the next adjacent outer one as said ribs are moved inwardly to a collapsed position along said spar, said means comprising a crank spring member including an arm projecting outwardly from said rib toward the next adjacent rib and a hook portion movable upon deflection of said arm into engagement with a locking bolt carried by the next inner rib member.

24. A rotary wing aircraft comprising a rotatable rotor head, a blade assembly including a spar pivotally mounted at its inner end on said rotor head, bolt means for anchoring said spar in a radially extending position in respect to said rotor head, said bolt means including a removable bolt element for permitting pivotal movement of said blade assembly to a retracted position alongside said rotor head, and lift-producing profile means carried by said spar and slidably movable therealong, and control means associated with said lift-producing profile means for retracting said lift-producing profile means inwardly toward said rotor head to expose said spar, and means forming an air foil casing surrounding said blade for accommodating said lift-producing profile means therein when retracted.

25. Stoppable rotor with preferably folding rotor blades for a convertible rotating wing aircraft, comprising at least one rigid rotor blade spar adapted to be articulated on the rotor head and having a low-resistance cross-section producing a small drag and with lift-producing profile means arranged on said spar and movable therealong for varying the aerodynamic efficiency of said blade so that the rotor practically produces no more lift independent of the blade angle.

References Cited by the Examiner
UNITED STATES PATENTS 3,256,938  6/1966  Exner _____ 170—160.12

FOREIGN PATENTS 509,244  7/1939  Great Britain.

MARTIN P. SCHWADRON, *Primary Examiner.*

EVERETTE A. POWELL, *Examiner.*